United States Patent
König et al.

(10) Patent No.: US 8,157,992 B2
(45) Date of Patent: Apr. 17, 2012

(54) DEVICE AND METHOD FOR THE CLEANING OF LUBRICANT AND A LUBRICANT CIRCUIT

(75) Inventors: Nikolaus König, Althegnenberg (DE); Michael Förster, Gablingen (DE)

(73) Assignee: MAN Diesel SE, Augsburg (DE)

( * ) Notice: Subject to any disclaimer, the term of this patent is extended or adjusted under 35 U.S.C. 154(b) by 717 days.

(21) Appl. No.: 12/283,834

(22) Filed: Sep. 16, 2008

(65) Prior Publication Data

US 2009/0071913 A1 Mar. 19, 2009

(30) Foreign Application Priority Data

Sep. 18, 2007 (DE) .......................... 10 2007 044 524

(51) Int. Cl.
*F01M 11/03* (2006.01)
(52) U.S. Cl. ......... 210/167.02; 210/167.04; 210/167.05; 210/167.06; 210/167.08; 210/167.09; 210/167.31; 210/167.32; 210/181; 210/195.1; 210/196; 210/416.5; 210/171; 210/409; 184/6.24
(58) Field of Classification Search .................. None
See application file for complete search history.

(56) References Cited

U.S. PATENT DOCUMENTS

| | | | | |
|---|---|---|---|---|
| 4,865,742 A * | 9/1989 | Falletti | ........................... | 210/637 |
| 4,978,506 A * | 12/1990 | Calderwood | .................... | 422/73 |
| 5,137,654 A * | 8/1992 | Burke | ............................ | 210/652 |
| 5,205,937 A * | 4/1993 | Bhave et al. | .................... | 210/651 |
| 5,300,197 A * | 4/1994 | Mitani et al. | .................... | 202/177 |
| 5,372,722 A * | 12/1994 | Schwering et al. | ............ | 210/636 |
| 5,525,371 A * | 6/1996 | Sweeney et al. | ................ | 427/327 |
| 5,593,596 A * | 1/1997 | Bratten | ........................... | 210/741 |
| 5,706,841 A * | 1/1998 | Werre et al. | ................... | 134/56 R |
| 5,965,015 A * | 10/1999 | Ronan et al. | ..................... | 210/87 |
| 6,066,264 A * | 5/2000 | Ronan et al. | ................... | 210/776 |
| 6,110,390 A * | 8/2000 | Potter et al. | .................... | 210/799 |
| 6,162,355 A * | 12/2000 | Mizuno et al. | .............. | 210/167.02 |
| 6,213,133 B1 * | 4/2001 | Reicks | ........................... | 134/22.1 |
| 6,322,694 B1 * | 11/2001 | Iliadis et al. | ............. | 210/167.01 |
| 6,379,540 B2 * | 4/2002 | Reicks | ........................... | 210/139 |
| 7,033,513 B2 * | 4/2006 | Riggins et al. | ................ | 210/805 |
| 7,056,442 B2 * | 6/2006 | Hansen | ........................... | 210/805 |
| 7,172,689 B2 * | 2/2007 | Bratten | .......................... | 210/137 |

(Continued)

FOREIGN PATENT DOCUMENTS

JP 2009074548 A * 4/2009

*Primary Examiner* — Robert James Popovics
(74) *Attorney, Agent, or Firm* — Cozen O'Connor

(57) ABSTRACT

A cleaning device for cleaning lubricating oil which circulates in a lubricating oil circuit has an intake to be connected with the lubricating oil circuit, through which a part quantity of the lubricating oil circulating in the lubricating oil circuit is to be fed to the cleaning and a return to be connected with the lubricating oil circuit for the returning of the cleaned lubricating oil into the lubricating oil circuit. The device includes a closed cleaning circuit in which the intake terminates, a feed device for the circulating a mixture of a circulating oil contained in the cleaning circuit and the lubricating oil to be cleaned fed to the cleaning circuit through the intake, and at least one cross-flow filter arranged downstream of the feed device seen in the feed direction, which is provided with at least one filter membrane past which flows the mixture of circulating oil and lubricating oil to be cleaned, wherein a part of the mixture flows through the filter membrane into a filtrate chamber connected with the return.

11 Claims, 3 Drawing Sheets

U.S. PATENT DOCUMENTS

| | | | |
|---|---|---|---|
| 7,338,606 B2* | 3/2008 | Bratten | 210/741 |
| 7,510,662 B1* | 3/2009 | Hansen | 210/805 |
| 2004/0035805 A1* | 2/2004 | Hansen | 210/774 |
| 2008/0250700 A1* | 10/2008 | Tremblay et al. | 44/301 |
| 2009/0071913 A1* | 3/2009 | Konig et al. | 210/791 |
| 2010/0170161 A1* | 7/2010 | Berndt et al. | 51/306 |

* cited by examiner

DEVICE AND METHOD FOR THE CLEANING OF LUBRICANT AND A LUBRICANT CIRCUIT

BACKGROUND OF THE INVENTION

1. Field of the Invention

The invention relates to a device for the cleaning of lubricant, more preferably lubricating oil, which circulates in a lubricant circuit which may, for example, be a lubricant circuit of an engine, a compressor, a turbocharger, or the like, with an intake to be connected with the lubricant circuit, through which a portion of the lubricant in the lubricant circuit is fed to the cleaning device for at least partial removal of contaminants contained in the lubricant, and a return to be connected with the lubricant circuit for the returning of the cleaned lubricant into the lubricant circuit.

2. Description of the Related Art

Engines, more preferably large engines, such as ship's engines, but also compressors, turbochargers and the like are customarily equipped with an extensive lubricant system in order to ensure low-wear operation. The lubricant provides for the lubrication of moving components, acts as a coolant, and removes combustion residue and abrasives from surfaces of the bearings and sliding surfaces that move relative to one another. During operation, the lubricant is intermittently or continuously circulated in a lubricant circuit with the help of one or several lubricant pumps. Since during the course of the operation the amount of components of combustion residue, abrasion, and the like in the lubricant increases, it is required to continuously or discontinuously filter such contaminants from the lubricant using appropriate devices.

At present, lubricating oil for example with large diesel engines is cleaned through separators using water, wherein oil/water sludges are accordingly created which have to be treated or disposed of, which is expensive.

SUMMARY OF THE INVENTION

Disclosed is a device and a method for the cleaning of lubricant, which circulates in a lubricant circuit with an improved cleaning effect compared with known cleaning devices.

According to one embodiment of the invention includes a closed cleaning circuit in which the intake terminates, a delivery device for the circulation of a circulating oil or means contained in the cleaning circuit which mixes with the lubricant to be fed to the cleaning circuit through the intake to be cleaned and which preferably is the same lubricant, and at least one cross-flow filter arranged downstream of the delivery device seen in delivery direction, the at least one cross-flow filter being provided with at least one filter membrane which is passed by the mixture of circulating oil and lubricant for filtration, wherein a part of the mixture flows through the filter membrane into a filtrate chamber connected with the return.

According to one embodiment of the present invention, a portion of the lubricants circulating in the lubricant circuit is diverted through the intake for cleaning and fed to the device for the cleaning in the bypass flow. The device for the cleaning is equipped with a closed cleaning circuit in which the intake terminates. The cleaning circuit is filled with additional lubricant that is circulated as circulating oil with the help of a delivery device. The lubricant to be cleaned is mixed with the circulating oil and fed to a filter device. According to one embodiment of the invention, the filter device is embodied as cross-flow filter through which the mixture of lubricant to be cleaned and circulating oil is delivered with appropriate delivery pressure. A filter membrane is arranged in the cross-flow filter through which a part of the mixture, brought about by the delivery pressure, flows in into a filtrate chamber of the cross-flow filter for cleaning. Through the flow speed of the oil quantity circulating in the cleaning circuit, a cleaning effect is created on the surface of the filter membrane which prevents or at least restricts the formation of a filter cake on the side of the filter membrane facing the circulating oil quantity and advantageously stabilizes the specific filtrate flow through the filter membrane at the same time. The cleaned lubricant that flows into the filtrate chamber is subsequently fed back to the lubricant circuit via the return.

Utilizing this cleaning principle, wherein a cross-flow filter is employed, the additional use of water as an oil cleaning means is no longer required and the development of the oil/water sludge which is particularly expensive to treat is avoided, which is preferable for environmental reasons. Compared with the prior art, necessary technical components are of simpler construction so that the required investments are lower. In addition to this, an improved filtering performance is achieved because of the cross-flow filtration so that the loss of lubricant, which otherwise has to be removed from the lubricant circuit with the contaminants, is also lower.

One embodiment of the invention utilizes a continuous cleaning operation and, more preferably when compared with known separator technology, provides for separation of particles without density difference.

The cross-flow filter in the filtrate chamber preferably comprises one or several filter tubes as a filter membrane through which the mixture flows for filtration and on the inner side of which a fine-pore surface filtration layer is provided. The use of filter tubes has the advantage that with smallest flow cross section the greatest possible filtering area is provided. In addition, a high flow velocity results from the low flow cross-section that prevents the formation of the filter cake. In one embodiment, plate-shaped filter membranes are provided which, arranged parallel next to one another, alternately form a filtrate chamber and a concentrate chamber connected with the cleaning circuit. The cross-flow filter can also comprise multi-cell filter elements, more preferably ceramic modules with round and/or rectangular flow channels, which are more cost effective with the same nominal filter surface area.

In a preferred embodiment, the cleaning circuit comprises an inlet for fresh circulating oil that is connected with the cleaning circuit via an expansion vessel and a drain provided with a valve for discharging dirty circulating oil from the cleaning circuit. In this manner the component of contaminants in the circulating oil can be set and the volumetric loss of contaminated, discharged circulating oil replenished. In this embodiment, after reaching a predetermined concentration rate of contaminants, the circulating oil can be discharged from the highly contaminated circulating oil as oil sludge, which is replaced with uncontaminated circulating oil. The quantity which is given off as oil sludge and replaced with uncontaminated circulating oil is set so that the differential contaminant quantity of the volumetric flows of lubricant to be cleaned minus cleaned lubricant is balanced through the contaminant content of the quantity of the circulating oil discharged as oil sludge. The given off oil sludge can preferably be separated into oil and contaminant for example by means of a centrifuge so that reclaimed oil can be returned to the cleaning circuit and the product loss and the residual quantity to be disposed off can be still be further minimized.

The operating pressure acting in the lubricant circuit may be sufficient to discharge the predetermined quantity of lubricant to be cleaned into the cleaning circuit with adequate pressure. In order to be independent of the operating pressure of the lubricant circuit it is however suggested with a preferred further development of the device according to the invention to also provide a feed device, preferentially a pump, in the intake, which delivers the branched-off lubricant to be cleaned into the cleaning circuit with a predetermined delivery pressure. While the feed device arranged in the cleaning circuit circulates the circulating oil and generates the necessary pressure to push lubricant-circulating oil mixture through the cross-flow filter, an additional pressure in the cleaning circuit can be generated with the help of this second feed device provided in the intake, through which the filter performance of the cross-flow filter can be further increased and which can be deliberately changed through variation of the efficiency of this second feed device.

In order to achieve a preferably good filtering performance with the device according to one embodiment of the invention it is further proposed to heat the oil to be cleaned to a process temperature which is below an oil damaging temperature or limited by such. Preferably the oil in this case is maximally heated, i.e. to just below the oil damaging temperature. To this end, the oil can preferably be heated to a process temperature of approximately 110 to 130° C. preferentially to a process temperature of approximately 120° C., with synthetic oils even to approximately 180° C. To this end it is proposed that at least one heat exchanger for heating the lubricant to be cleaned is arranged in the intake. Preferably two heat exchangers are provided wherein one of the heat exchangers is a counterflow, parallel flow, or cross-flow heat exchanger, which is incorporated in the return of the cleaned lubricant in such a manner that the cleaned lubricant to be returned into the lubricant circuit heats the lubricant to be cleaned by the cleaning circuit. In this manner two objectives are achieved, namely heating the lubricant still to be cleaned while the cleaned lubricant is cooled down to a temperature which is optimal for the operation of the lubricant circuit. The second heat exchanger is preferably an external heated heat exchanger whose performance can be varied so that the temperature of the lubricant to be cleaned can be regulated to a desired process temperature.

The device according to the invention can be emptied at regular intervals for maintenance purposes, cleaned with suitable cleaning fluids, and refilled. However, in order to make cleaning of the filter membrane possible, even during the running operation of the device according to the invention, it is proposed to equip the device with a flushing device for flushing the cross-flow filter with a flushing fluid. The flushing device coupled to the cross-flow filter via a 3-way valve and the return. With the help of the flushing device a flow pressure that acts contrary to the normal operating direction can be generated preferentially while the feed device of the cleaning circuit circulates the circulating oil, with which the flushing fluid is fed back through the filtrate chamber into the cleaning circuit. Uncontaminated lubricant fed through the cross-flow filter with appropriate pressure for example is suitable as flushing fluid.

To generate the pressure a suitable pump can be provided. Alternatively it is also possible however to feed the flushing fluid with the help of an auxiliary medium, preferentially compressed air, opposite the filtration direction through the filter membrane. The use of compressed air is particularly advantageous if in the cleaning circuit a pressure expansion vessel is provided so that following the flushing of the cross-flow filter with flushing fluid the compressed air is further fed into the cleaning circuit, flows through the filter structure of the cross-flow filter, cleaning the latter in the process. The compressed air contained in the cleaning circuit then collects in the expansion vessel and can be discharged from the latter preferentially in a pressureless manner. The flushing process can either be conducted in a continuous manner or in a pulsating manner, wherein the latter offers the advantage that through the pressure impulses spreading in the flushing fluid the cleaning effect is further improved. In one embodiment, one or more ultrasonic probes are present on the cross-flow filter to generate ultrasound waves that are propagated in the flushing fluid or in the oil present in the cross-flow filter to loosen contaminants adhering to the filter membrane. In one embodiment, suitable flushing fluids which chemophysically support the cleaning effect are used and because of phase separation collect in the expansion vessel of the cleaning circuit to be discharged from the latter.

In order to effectively prevent the formation of deposits on the filter membrane while filtering the lubricant, cleaning bodies, for example small balls of porous material are preferably added to the circulating oil in the cleaning circuit. In a preferred embodiment of the invention, the balls are moved along on the surface of the filter membrane by the volumetric flow of the circulating oil and in the process remove the filter cake that has settled on the surface. A feed device for the cleaning circuit such as a jet pump is then preferably used to prevent malfunctioning of the feed device caused by cleaning bodies that may get trapped in the feed device. Due to the acceleration within the jet pump, the surfaces of the cleaning bodies are cleaned with every pass through the jet pump and any particles adhering to them are released into the circulating oil. Alternatively however other feed devices, preferably centrifugal and/or hose pumps are used.

The driving connection of the jet pump can likewise be supplied by the circulating oil of the cleaning circuit. To this end, the driving connection of the jet pump is connected with a feed line which in turn is in flow connection through a separator for retaining the cleaning bodies arranged downstream of the cross-flow filter. In order to achieve the required flow pressure for the jet pump a pump is arranged in the feed line which compresses the partial volumetric flow of the circulating oil, which reaches the feed line via the separator from the cleaning circuit to an operating pressure.

To achieve a good mixing of the lubricant to be cleaned with the circulating oil, the intake, through which the lubricant to be cleaned is fed to the cleaning circuit, preferentially terminates in the jet pump.

In order to still further increase the cleaning performance of the device according to one embodiment of the invention wherein cleaning bodies are used, the device comprises a bypass arranged downstream of the feed line seen in a delivery direction of the pump, which terminates in the intake in front of the jet pump, i.e., discharges a part flow of the circulating oil past the jet pump from the cleaning circuit and directly mixes said part flow with the lubricant to be cleaned in the intake which flows through the intake in the direction of the cleaning circuit. In order to pre-mix preferably clean circulating oil with the lubricant to be cleaned, a hydrocyclone is additionally arranged in the bypass that serves for the cleaning of the circulating oil that flows into the intake. The loss of circulating oil or lubricant on discharging the oil sludge is reduced and the dirt concentration of the discharge is increased with the help of the hydrocyclone. In the hydrocyclone, the particle concentration for the exiting sludge flow is increased and the dirt concentration in the circulating oil lowered with identical discharge concentration. In this way a further improved filtration flow is achieved and the lifespan between the cleaning cycles increased.

In a further embodiment the setting of the part flows of the circulating oil flowing into the feed line and the bypass is performed with the help of a first valve arranged in the feed line after the branch-off of the bypass and a second valve arranged in the bypass upstream of the hydrocyclone. Here the valves are matched to each other while the valves are adjusted either automatically via a regulating device which regulates the valves based on the signals of two sensors arranged at a suitable point. For example, volumetric flow sensors are arranged in a flow direction immediately after the valves. Alternatively the setting of the valves can be performed with a control according to predetermined control cycles.

In order to heat the lubricant to be cleaned in the intake to the desired process temperature it is further proposed to provide a heat exchanger to be externally heated in the bypass which is arranged upstream of the hydrocyclone seen in the flow direction.

A further aspect the invention relates to a lubricant system, more preferably for an engine, which lubricant system is equipped with a device according to the invention for cleaning the lubricant and a method for cleaning of lubricant. The invention is explained in more detail in the following by means of three exemplary embodiments making reference to the drawings.

The various limitations are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
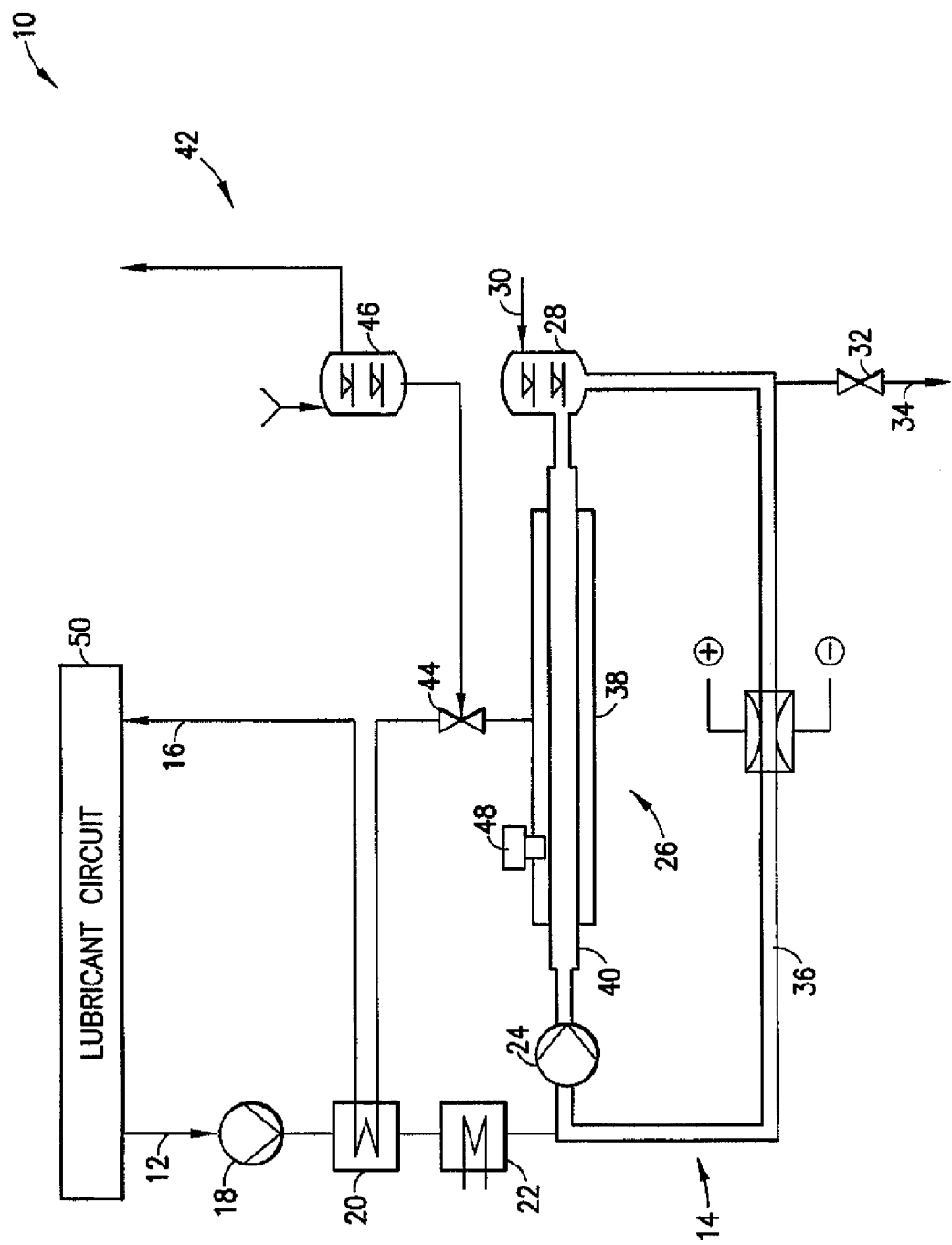
FIG. 1 is a hydraulic circuit diagram according to a first exemplary embodiment of a device according to the invention for the cleaning of lubricating oil which is connected to a lubricating oil circuit of an engine.

FIG. 1 shows the hydraulic circuit diagram of a first exemplary embodiment of a device 10 according to the invention for the cleaning of lubricating oil that is connected to a lubricating oil circuit 50 of an engine.

The device 10 has an intake 12 connected with a lubricating oil circuit through which a partial quantity of the lubricating oil circulating in the lubricating oil circuit can be diverted into a cleaning circuit 14 of the device 10. The partial quantity is preferably regulated with a valve (not shown). Furthermore, a return 16 is provided on the cleaning circuit 14 through which cleaned lubricating oil from the device 10 can be returned in to the lubricating oil circuit.

A pump 18 is coupled to the intake 12, which delivers the lubricating oil to be cleaned to cleaning unit 14. In a preferred embodiment, pump 18 has operating pressure of approximately 6 bar, corresponding to the maximum permissible pressure in the cleaning circuit 14.

Pump 18 is preferably embodied as displacement pump with constant or regulated speed and checks the lubricating oil quantity fed into the cleaning circuit 14. Because the contaminant load introduced in the lubricating oil is frequently constant over time, a constant volumetric flow is discharged from the lubricating oil circuit through the pump 18 in the exemplary embodiment. The equilibrium pressure, which establishes itself in the cleaning circuit as a result of this constant volumetric flow, can be used as indicator for a variable back-flushing cleaning interval, which is explained in more detail below.

Arranged downstream of the pump 18 in delivery direction is a first heat exchanger 20 with which the lubricating oil to be cleaned is heated to a higher temperature. The heat exchanger 20 is designed as a counterflow heat exchanger and is heated in the counterflow by the cleaned lubricating oil flowing back into the lubricating oil circuit through the return 16. In this manner the cleaned lubricating oil on the one hand is again cooled down to a temperature near the operating temperature of the lubricating oil circuit suitable for the lubricating oil circuit while the lubricating oil to be cleaned is simultaneously heated to a higher temperature while saving energy.

Arranged downstream of the first heat exchanger 20 is a second heat exchanger 22 which by means of an exhaust heat of the engine heats the lubricating oil already preheated by the first heat exchanger 20 to a preferable process temperature of approximately 120° C. In order to provide an accurate setting of the process temperature a temperature sensor (not shown) is arranged downstream of the second heat exchanger 22 if applicable, which senses the temperature of the lubricating oil and whose signal is utilized by a regulating unit (not shown) in order to regulate the heat output of the second heat exchanger 22 as a function of the temperature of the lubricating oil immediately before the entry in the cleaning circuit 14.

The cleaning circuit 14 is embodied as a closed circuit in which the lubricating oil is circulated as circulating oil. To this end a pump 24 is arranged in the cleaning circuit 14 immediately after the termination of the intake 12 which delivers the circulating oil contained in the cleaning circuit 14 as well as the lubricating oil to be cleaned, which flows from the intake 12 into the cleaning circuit 14 where it intermixes with the circulating oil, in the direction of a cross-flow filter 26. Arranged downstream of the cross-flow filter 26 is an expansion vessel 28 to accommodate the back-flushed volume during an automatic cleaning described in the following, via which, through an inlet 30, additional lubricating oil is introduced into the cleaning circuit 14. Seen in delivery direction, after the expansion vessel 28, a drain 34, which can be shut off via a shut-off valve 32, is provided. A further line section 36 in which the intake 12 terminates closes the cleaning circuit 14.

The cross-flow filter 26 has a filtrate chamber 38, which is closed to the outside and which is in flow connection with the return 16. In the filtrate chamber 38 one or more filter tubes 40, which serve as filter membranes are accommodated which are in flow connection with the cleaning circuit 14 and through which the circulating oil flows. The inner sides of the filter tubes 40 preferably have a fine-pore surface filtration layer.

In cleaning operation the two pumps 18 and 24 are activated so that the desired partial quantity of lubricating oil to be cleaned is delivered from the lubricating oil circuit while the circulating oil is simultaneously circulated in the cleaning circuit 14. The lubricating oil, which flows into the cleaning circuit 14 through the intake 12, mixes with the circulating oil and continues flowing in the direction of the cross-flow filter 26 wherein an operating pressure of approximately 6 bar is preferably maintained.

As the circulating oil, with its operating pressure of approximately 6 bar flows through the cross-flow filter 26, a part of the circulating oil is pressed through the fine-pore filter tubes 40 and being cleaned in the process, reaches the filtrate chamber 38. From filtrate chamber 38, the cleaned oil flows into the return 16 and finally into the lubricating oil circuit. In the process, suspended matter such as contaminants, combustion residue, and abrasions contained in the circulating oil are filtered out into the filtrate chamber 38 on passing through the one or more filter tubes 40 and remain on the inner side of the one or more filter tubes 40. Due to the flow velocity of the circulating oil caused by the pump 24 shear forces develop on the inside of the filter tubes 40 which reduce the accumulation of a filter cake and in the process stabilize the specific filter flow through the filter tubes 40. The circulating oil drags along the suspended matter filtered out in the filter tubes 40.

When the component of contaminants in the circulating oil reaches a predetermined limit, the shut-off valve 32 is opened and the contaminated circulating oil drained from the drain 34, which is subsequently supplied for further treatment and disposal. The contaminated circulating oil given off is preferably oil sludge. In order to offset the drained quantity of circulating oil fresh, uncontaminated lubricating oil is simultaneously fed into the cleaning circuit 14 via the inlet 30 and the expansion vessel 28 or, preferably, compensated via the replenishing system (not shown) of the lubricating oil circuit. The quantity which is given off as contaminated circulating oil or oil sludge and replaced with uncontaminated circulating oil is set so that the differential contaminant quantity of the volumetric flows of lubricating oil to be cleaned, which flows into the cleaning circuit through the intake 12 minus cleaned lubricating oil which flows out of the cleaning circuit 14 through the return 16 is balanced through the contaminant content of the quantity of the contaminated circulating oil discharged as oil sludge.

In this manner the lubricating oil is cleaned with comparatively little expenditure and high efficiency wherein the quantity of lubricating oil, which is lost as oil sludge during the cleaning process, to be replaced is reduced compared with the cleaning techniques used in the prior art.

In order to ensure an adequate state of equilibrium with an adequately high filtration performance the device 10 is further equipped with a flushing device 42. The flushing device 42 is in flow connection with the return 16 via a 3-way valve 44 and a reservoir 46 for clean lubricating oil. The reservoir 46 is in flow connection with a compressed-air line. In order to support the flushing performance of the flushing device 42 several ultrasonic probes 48 are attached to the cross-flow filter 26.

To flush the cross-flow filter 26, the pump 18 of the branch off 12 is initially switched off. While the system pressure decreases highly concentrated lubricating oil phase drains via the drain 34 until the shut-off valve 32 shuts off this drain 34. Following this, the cleaning circuit 14 is pressure-relieved via the connection 30 and the 3-way valve 44 subsequently switched so that the flow connection between the reservoir 46 subjected to compressed air and filtrate chamber 38 is opened, while the return 16 itself is shut off. The pump 24 is continued to be operated so that the circulating oil circulates in the cleaning circuit 14. After this, the lubricating oil contained in the reservoir 46 is delivered into the filtrate chamber 38 with compressed air, wherein the lubricating oil is pressed through the porous filter layers of the filter tubes 40 and in the process contaminants adhering in the filter layers are removed which are then dragged along by the circulating oil flowing past. In order to increase the cleaning effect the compressed air is blown in a pulsating manner so that shock waves or pressure impulses are generated in the lubricating oil. In addition the ultrasonic probes 48 are activated which emit corresponding ultrasound waves into the lubricating oil.

The compressed air is blown into the system until the compressed air flows into the cleaning circuit 14 via the filter tubes 40, wherein the contaminants are removed from the filter tubes 40. In the process, the volume of the back-flush medium is absorbed or offset through level change in the expansion vessel 28. The compressed air is moved by the circulating oil and collects in the expansion vessel 28 from which it is discharged in a pressureless manner. The flushing process is terminated after this. By admitting pressure to the cleaning circuit 14 via the inlet 30, cleaned oil is delivered back into the reservoir 46 until its filling level is reached and the reservoir 46 is ready for a new flushing operation. After this, the 3-way valve 44 is switched over again and the oil supply via the pump 18 resumed.

The cleaning, during which the heat exchanger 22 is preferably deactivated can take place during the operation of the device 10 at regular intervals or as a function of the filtrate performance, a system pressure or a cleaning quantity. If the plant is to be cleaned completely the circulating oil must be drained and suitable cleaning fluids introduced via the flushing device.

Through an electrostatically acting auxiliary device in the circulating system (not shown) for example in the line section 36, the agglomeration of finest particles can be supported and thus the lifespan of the cross-flow filter improved.

Figure 2:
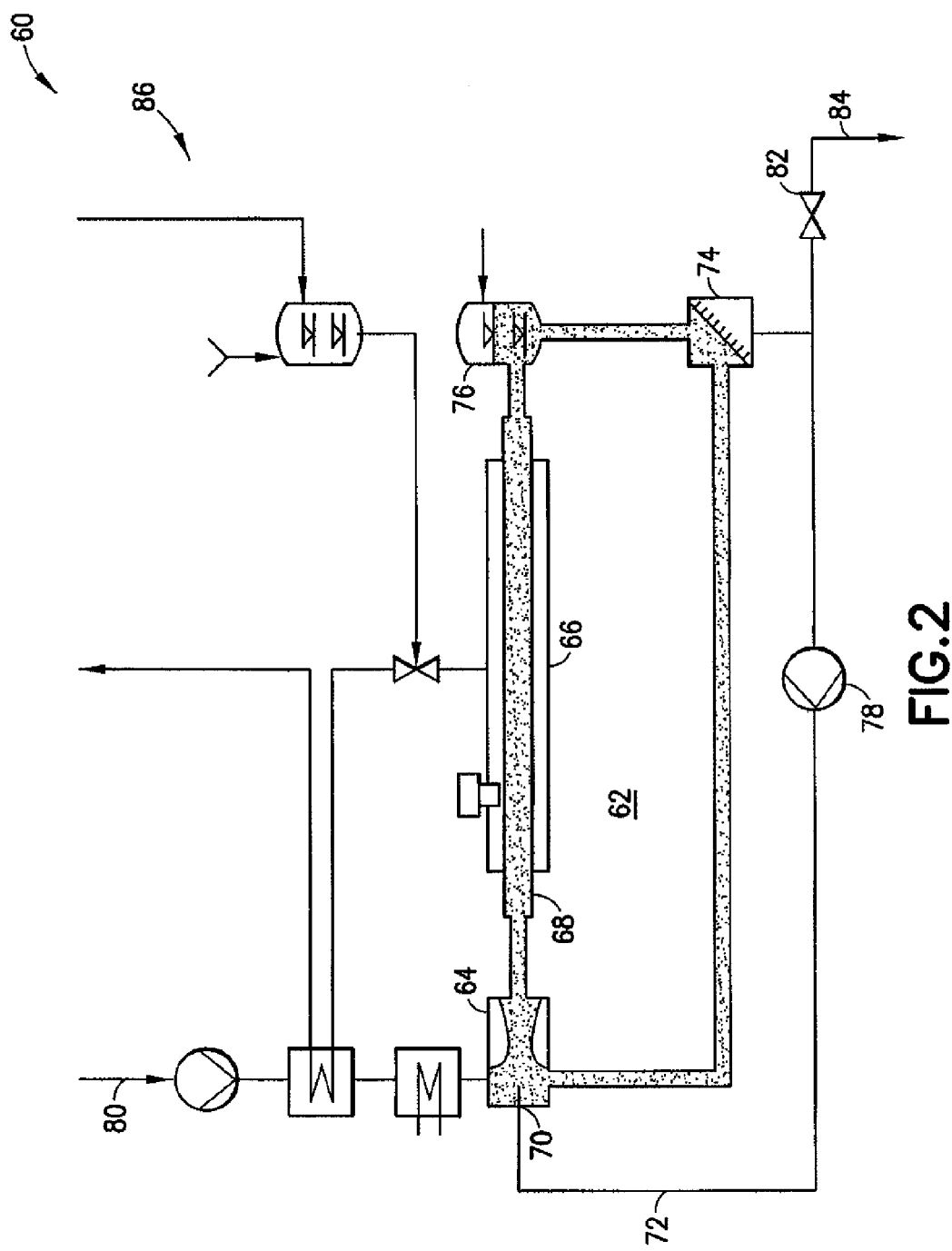
FIG. 2 is a hydraulic circuit diagram according to a second exemplary embodiment of a device according to the invention whose construction substantially corresponds to the embodiment shown in FIG. 1 with an expansion for operating the device with cleaning bodies.

FIG. 2 shows a second embodiment of a device 60 according to the invention. The construction of the device 60 substantially corresponds to the construction of the device 10 shown in FIG. 1. The substantial difference to this is that in the cleaning circuit 62 a jet pump 64 instead of the pump 24 is arranged upstream of the cross-flow filter 66. The reason for this is that in the circulating oil small cleaning bodies are contained (represented by the dots) which during the circulating of the circulating oil are fed through the filter tubes 68 to remove contaminants adhering to their inner sides.

The jet pump 64 has a drive connection 70, which is supplied with circulating oil via a supply line 72. The supply line 72 to this end is in flow connection with a separator 74 which seen in flow direction is arranged downstream of the expansion vessel 76 of the cleaning circuit 62. The separator 74 makes possible splitting the circulating oil flow in two volumetric flows wherein one of the volumetric flows contains the cleaning bodies while the second volumetric flow, which flows into the feed line 72, does not contain any cleaning bodies.

In order to set the operating pressure required for the operation of the jet pump 64 a pump 78 is additionally arranged in the feed line 72, which delivers the circulating oil in the feed line 72 in the direction of the jet pump 64.

The mode of operation of the device 60 substantially corresponds to that of the device 10, merely with the difference that the circulation of the circulating oil and the cleaning bodies is performed through the jet pump 64 and the intake 80 terminates in the jet pump 64. Through the jet pump 64, mixing—of the lubricating oil to be cleaned with the circulating oil is achieved. In this manner contaminants adhering to the cleaning bodies, removed by the cleaning bodies from the filter tubes 68, separate from the cleaning bodies. The draining of the oil sludge is effected via the drain 84 shut off by a shut-off valve 82 provided by the feed line 72 in front of the pump 78 in the manner likewise described making reference to the device 10. In the same manner the device is also equipped with a comparably operating flushing device 86.

Figure 3:
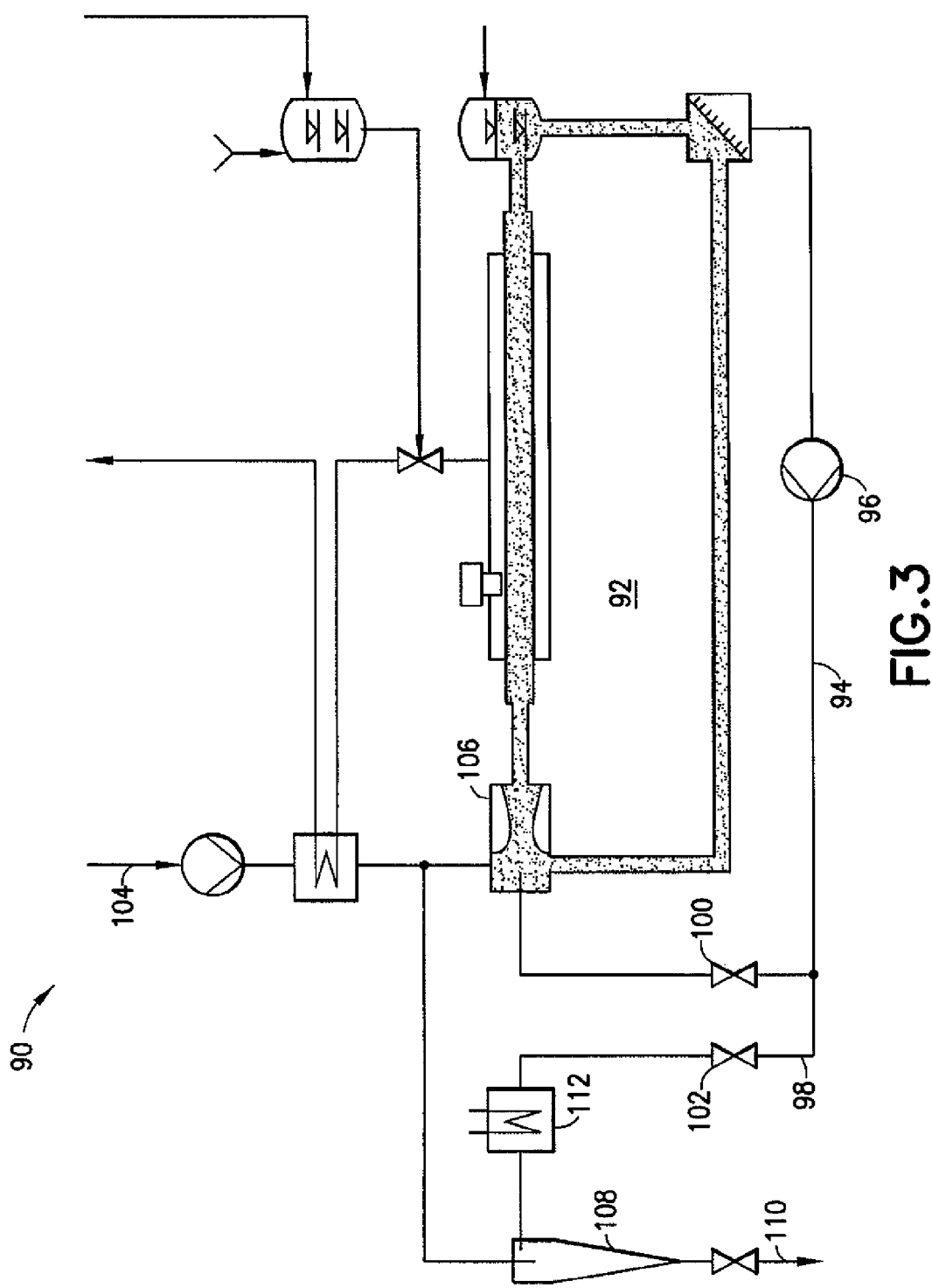
FIG. 3 is a hydraulic circuit diagram according to a third exemplary embodiment of a device according to the invention whose construction substantially corresponds to the construction of the embodiment shown in FIG. 1 including a hydrocyclone.

FIG. 3 finally shows a third exemplary embodiment of a device 90 for the cleaning of lubricating oil according to the invention. The construction of the cleaning circuit 92 of this device 90 substantially corresponds to the construction of the cleaning circuit 62 of the device 60 related above. However the feed line 94 comprises a bypass 98 arranged downstream in delivery direction of the pump 96 wherein the purified oil flows flowing into the feed line 94 and the bypass 98 can be regulated with the help of two valves 100 and 102 provided after the branch-off of the bypass 98.

The bypass 98 terminates in the intake 104 in front of the jet pump 106 so that a part flow of the circulating oil is discharged from the cleaning circuit 92 past the jet pump 106 and mixed directly with the lubricating oil to be cleaned flowing through the intake 104 in the direction of the cleaning circuit 92. In order to premix preferably clean circulating oil with the lubricating oil to be cleaned a hydrocyclone 108 is additionally arranged in the bypass 98 with which the circulating oil flowing into the intake 104 is cleaned, while the oil sludge is drained from the hydrocyclone 108 via a drain 110 that can be shut off. The hydrocyclone 108 preferentially separates large and/or heavy particles. An externally operated heat exchanger 112 is additionally arranged upstream of the hydrocyclone 108 seen in flow direction with which the circulating oil is heated to a desired process temperature. By shifting the heat supply from the heat exchanger 22 to the heat exchanger 112 advantageously, since substantially only the hydrocyclone restricts the temperature, a lower viscosity and density of the oil can be set and thus a better efficiency of the hydrocyclone 108 be achieved while the operating temperature of the circulating oil remains low.

With the help of the hydrocyclone 108 the loss of circulating oil or lubricating oil on discharging the oil sludge is reduced and the contaminant concentration of the discharge increased. So it is that in the hydrocyclone 108 the particle concentration for the exiting sludge flow is increased and with identical discharge concentration the contaminant concentration in the circulating oil is reduced. In this manner a further improved filtration flow is achieved and the service life between the cleaning cycles increased.

The exemplary embodiments described constitute only three possibilities of realizing the device according to the invention. So it is conceivable to connect several cross-flow filters in parallel or in series. It is further conceivable to provide plate-shaped filter membranes instead of the filter tubes.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. In a lubricant circuit, the improvement comprising:
a cleaning device for the cleaning of a lubricant which circulates in said lubricant circuit, said cleaning device including:
an intake line connectable to the lubricant circuit through which at least a quantity of lubricant to be cleaned is fed to said cleaning device for at least partial removal of contaminants, resulting in a cleaned lubricant;
a first heat exchanger in said intake line;
a second heat exchanger in said intake line;
a return line connectable to said lubricant circuit for returning the cleaned lubricant into said lubricant circuit, said return line passing through said first heat exchanger;
a cleaning circuit in which said intake line terminates;
a feed device for circulating a mixture of a circulating lubricant contained in said cleaning circuit and the lubricant to be cleaned;
at least one cross-flow filter arranged downstream of the feed device which is provided with at least one filter membrane past which the mixture of circulating lubricant and the lubricant to be cleaned flows for filtering; and
a filtrate chamber into which a part of the mixture of circulating lubricant and the lubricant to be cleaned flows as cleaned lubricant, after passing through said filter membrane under a pressure generated by said feed device, said filtrate chamber being coupled to said return line to return the cleaned lubricant to said lubricant circuit.

2. The lubricant circuit according to claim 1, wherein the cross-flow filter comprises at least one filter tube through which the mixture flows for filtration, the at least one filter tube having a fine-pore surface filtration layer on an inner side of the at least one filter tube.

3. The lubricant circuit according to claim 1, wherein the cleaning circuit comprises an inlet for fresh circulating oil coupled to the cleaning circuit via an expansion vessel, and a drain provided with a valve for discharging contaminated circulating oil from the cleaning circuit.

4. The lubricant circuit according to claim 1, further comprising a feed device in the intake line configured to deliver branched-off lubricant to be cleaned into the cleaning circuit with a predetermined delivery pressure.

5. The lubricant circuit according to claim 1, wherein said second heat exchanger is an externally heated heat exchanger.

6. The lubricant circuit according to claim 1, further comprising a flushing device for flushing of cross-flow filter with a flushing fluid which is coupled to the cross-flow filter via a 3-way valve and the return line.

7. The lubricant circuit according to claim 6, wherein the flushing device comprises a vessel for the flushing fluid that is fed through the filter membrane opposite a filtration direction.

8. The lubricant circuit according to claim 1, further comprising at least one ultrasonic probe on the cross-flow filter.

9. The lubricant circuit according to claim 1, wherein the lubricant circuit includes at least one of an engine, a compressor or a turbocharger.

10. The lubricant circuit according to claim 1, wherein the circulating oil in the cleaning circuit contains cleaning bodies, and wherein the feed device of the cleaning circuit is a jet pump whose drive connection is connected with a feed line, which is in flow connection with the cleaning circuit through a separator arranged downstream of the cross-flow filter, and that a pump in the feed line delivers a part of the circulating oil via the separator from the cleaning circuit for operating the jet pump.

11. The lubricant circuit according to claim 10, wherein the intake line terminates in the jet pump.

* * * * *